United States Patent
Siedow et al.

(10) Patent No.: US 11,778,466 B2
(45) Date of Patent: Oct. 3, 2023

(54) SYSTEM FOR SECURE RESOURCE ALLOCATION COMMUNICATION WITH A NETWORK

(71) Applicant: BANK OF AMERICA CORPORATION, Charlotte, NC (US)

(72) Inventors: Mary Ann Siedow, Jacksonville, FL (US); John Reynolds Dansak, Powder Springs, GA (US); Shardul Vasudev Joshi, Richardson, TX (US); Abhishek Palahalli Manjunath, The Colony, TX (US); Manish Kumar Nigam, McKinney, TX (US); David W. O'Neil, Lexington, MA (US); Thomas Clement Rowe, Douglasville, GA (US); Sai Prasanth Reddy Suri, Charlotte, NC (US); Matthew Edward Taylor, Garner, NC (US)

(73) Assignee: BANK OF AMERICA CORPORATION, Charlotte, NC (US)

(*) Notice: Subject to any disclaimer, the term of this patent is extended or adjusted under 35 U.S.C. 154(b) by 285 days.

(21) Appl. No.: 17/026,484

(22) Filed: Sep. 21, 2020

(65) Prior Publication Data

US 2022/0095108 A1    Mar. 24, 2022

(51) Int. Cl.
*H04W 12/00*    (2021.01)
*H04W 12/069*    (2021.01)
(Continued)

(52) U.S. Cl.
CPC ....... *H04W 12/069* (2021.01); *H04W 12/009* (2019.01); *H04W 12/041* (2021.01); *H04W 12/082* (2021.01)

(58) Field of Classification Search
CPC ............ H04W 12/069; H04W 12/009; H04W 12/082; H04W 12/041
See application file for complete search history.

(56) References Cited

U.S. PATENT DOCUMENTS

| | | | |
|---|---|---|---|
| 6,233,577 B1* | 5/2001 | Ramasubramani | H04L 9/40 713/156 |
| 7,653,379 B1* | 1/2010 | Meenan | H04W 12/06 455/410 |

(Continued)

OTHER PUBLICATIONS

Gail L. Grant : excerpts from "Understanding Digital Signatures", 1998, McGraw-Hill, p. 33-36 (Year: 1998).*

(Continued)

*Primary Examiner* — Catherine Thiaw
(74) *Attorney, Agent, or Firm* — Moore & Van Allen PLLC; R.W. McCord Rayburn

(57) ABSTRACT

Systems, computer program products, and methods are described herein for secure resource allocation communication with a network. The present invention may be configured to provide, to a device management system, a request for authentication and receive, from the device management system, a file including a link to a certificate system. The present invention may be further configured to provide, using the link, a certificate enrollment request to the certificate system and receive, from the certificate system, a signed certificate. The present invention may be further configured to establish, using the signed certificate, a wireless connection to a network. In some embodiments, the present invention may include a scanner device for processing instruments associated with resource allocations and a network device communicatively connected to the scanner device for enabling the scanner device to communicate wirelessly with the network.

20 Claims, 7 Drawing Sheets

(51) Int. Cl.
  *H04W 12/041* (2021.01)
  *H04W 12/082* (2021.01)

(56) References Cited

U.S. PATENT DOCUMENTS

| | | | |
|---|---|---|---|
| 7,698,549 B2* | 4/2010 | Thornton | H04L 9/3271 715/741 |
| 7,895,508 B2 | 2/2011 | Lee | |
| 8,151,336 B2* | 4/2012 | Savoor | H04L 9/3263 726/10 |
| 8,255,278 B1* | 8/2012 | Young | G06Q 20/322 705/17 |
| 8,482,783 B2 | 7/2013 | Fujita et al. | |
| 10,864,444 B1* | 12/2020 | Rao | A63F 13/35 |
| 2003/0101289 A1 | 5/2003 | Alikberov et al. | |
| 2004/0238629 A1* | 12/2004 | Buchholz | G06Q 20/343 235/383 |
| 2005/0097046 A1* | 5/2005 | Singfield | G06Q 20/1085 705/42 |
| 2008/0079985 A1 | 4/2008 | Ferlitsch | |
| 2014/0310777 A1* | 10/2014 | Truskovsky | H04L 63/0823 726/4 |
| 2014/0366105 A1* | 12/2014 | Bradley | H04L 63/083 726/5 |
| 2016/0050192 A1* | 2/2016 | Banerjee | H04L 63/0884 726/6 |
| 2016/0344559 A1* | 11/2016 | Ma | H04W 12/069 |
| 2018/0219739 A1* | 8/2018 | Berry | H04L 67/75 |
| 2019/0114640 A1* | 4/2019 | Rubin | G06F 18/23213 |
| 2019/0149542 A1* | 5/2019 | Scopis | G06F 21/40 726/7 |
| 2021/0067349 A1* | 3/2021 | Kruegel | H04L 9/3268 |
| 2021/0297259 A1* | 9/2021 | Rahn | H04L 9/0897 |

OTHER PUBLICATIONS

37. Hogan TC. "Now That the Floodgates Have Been Opened, Why Haven't Banks Rushed into the Certification Authority Business". NC Banking Inst . . . 2000;4:417 (Year: 2000).*

* cited by examiner

SYSTEM FOR SECURE RESOURCE ALLOCATION COMMUNICATION WITH A NETWORK

FIELD OF THE INVENTION

The present invention embraces a system for secure resource allocation communication with a network.

BACKGROUND

A scanner device may be used to scan instruments associated with resource allocations and transmit information regarding the instruments and/or the resource allocations via a network. To maintain security of the information regarding the instruments and/or the resource allocations, the scanner device may be connected to the network via a wired communication link.

SUMMARY

The following presents a simplified summary of one or more embodiments of the present invention, in order to provide a basic understanding of such embodiments. This summary is not an extensive overview of all contemplated embodiments, and is intended to neither identify key or critical elements of all embodiments nor delineate the scope of any or all embodiments. This summary presents some concepts of one or more embodiments of the present invention in a simplified form as a prelude to the more detailed description that is presented later.

In one aspect, a system for secure resource allocation communication with a network is presented. The system may include at least one non-transitory storage device and at least one processing device coupled to the at least one non-transitory storage device, where the at least one processing device is configured to provide, to a device management system, a request for authentication, receive, from the device management system, a file including a link to a certificate system, provide, using the link, a certificate enrollment request to the certificate system, receive, from the certificate system, a signed certificate, and establish, using the signed certificate, a wireless connection to a network.

In some embodiments, the at least one processing device is configured to, before providing the request for authentication, establish a wired communication link with the network, when providing the request for authentication, provide the request for authentication via the wired communication link, when receiving the file, receive the file via the wired communication link, when providing the certificate enrollment request, provide the certificate enrollment request via the wired communication link, and when receiving the signed certificate, receive the signed certificate via the wired communication link.

In some embodiments, the at least one processing device is configured to generate a key, where the request for authentication includes the key, and where the certificate enrollment request comprises the key.

In some embodiments, the certificate system generates the signed certificate based on the key.

In some embodiments, the file includes configuration instructions and the at least one processing device is configured to adjust, based on the configuration instructions, a configuration of the system.

In some embodiments, the at least one processing device is configured to, after adjusting the configuration of the system and when establishing the wireless connection, establish the wireless connection using ports and protocols identified by the configuration.

In some embodiments, the device management system is configured to authenticate the system for communication on the network for a time period and revoke authentication of the system after the time period.

In some embodiments, the system includes a scanner device for processing instruments associated with resource allocations and a network device communicatively connected to the scanner device for enabling the scanner device to communicate wirelessly with the network.

In some embodiments, the at least one processing device is configured to scan an instrument associated with a resource allocation and transmit information regarding the instrument via the wireless connection to the network.

In some embodiments, the at least one processing device is configured to print information on an instrument associated with a resource allocation and cause, based on printing the information and using the wireless connection, resources to be allocated.

In some embodiments, the at least one processing device is configured to provide, to the certificate system and via the wireless connection, a certificate renewal request and receive, from the certificate system and via the wireless connection, confirmation of renewal of the signed certificate.

In some embodiments, the at least one processing device is configured to, after receiving the signed certificate, store the signed certificate in the at least one non-transitory storage device.

In some embodiments, the certificate system generates the signed certificate based on a unique identifier of the system, where the unique identifier is provided by a manufacturer of the system.

In some embodiments, the network is configured to restrict the system from accessing portions of the network until the system uses the signed certificate to establish the wireless connection to the network.

In some embodiments, the certificate system includes a certificate enrollment server for receiving certificate enrollment requests, a certificate authority for receiving certificate signing requests from the certificate enrollment server and generating signed certificates, and a security module for encrypting signatures on certificates.

In another aspect, a computer program product for secure resource allocation communication with a network is presented. The computer program product may include a non-transitory computer-readable medium including code causing a first apparatus to provide, to a device management system, a request for authentication, receive, from the device management system, a file including a link to a certificate system, provide, using the link, a certificate enrollment request to the certificate system, receive, from the certificate system, a signed certificate, and establish, using the signed certificate, a wireless connection to a network In some embodiments, the non-transitory computer-readable medium may include code causing the first apparatus to, before providing the request for authentication, establish a wired communication link with the network, when providing the request for authentication, provide the request for authentication via the wired communication link, when receiving the file, receive the file via the wired communication link, when providing the certificate enrollment request, provide the certificate enrollment request via the wired communication link, and when receiving the signed certificate, receive the signed certificate via the wired communication link.

In some embodiments, the non-transitory computer-readable medium may include code causing the first apparatus to generate a key, where the request for authentication includes the key, and where the certificate enrollment request comprises the key.

In some embodiments the certificate system generates the signed certificate based on the key.

In some embodiments, the file includes configuration instructions and the non-transitory computer-readable medium may include code causing the first apparatus to adjust, based on the configuration instructions, a configuration of the system.

In yet another aspect, a method for secure resource allocation communication with a network is presented. The method may include providing, to a device management system, a request for authentication, receiving, from the device management system, a file including a link to a certificate system, providing, using the link, a certificate enrollment request to the certificate system, receiving, from the certificate system, a signed certificate, and establishing, using the signed certificate, a wireless connection to a network.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1A:
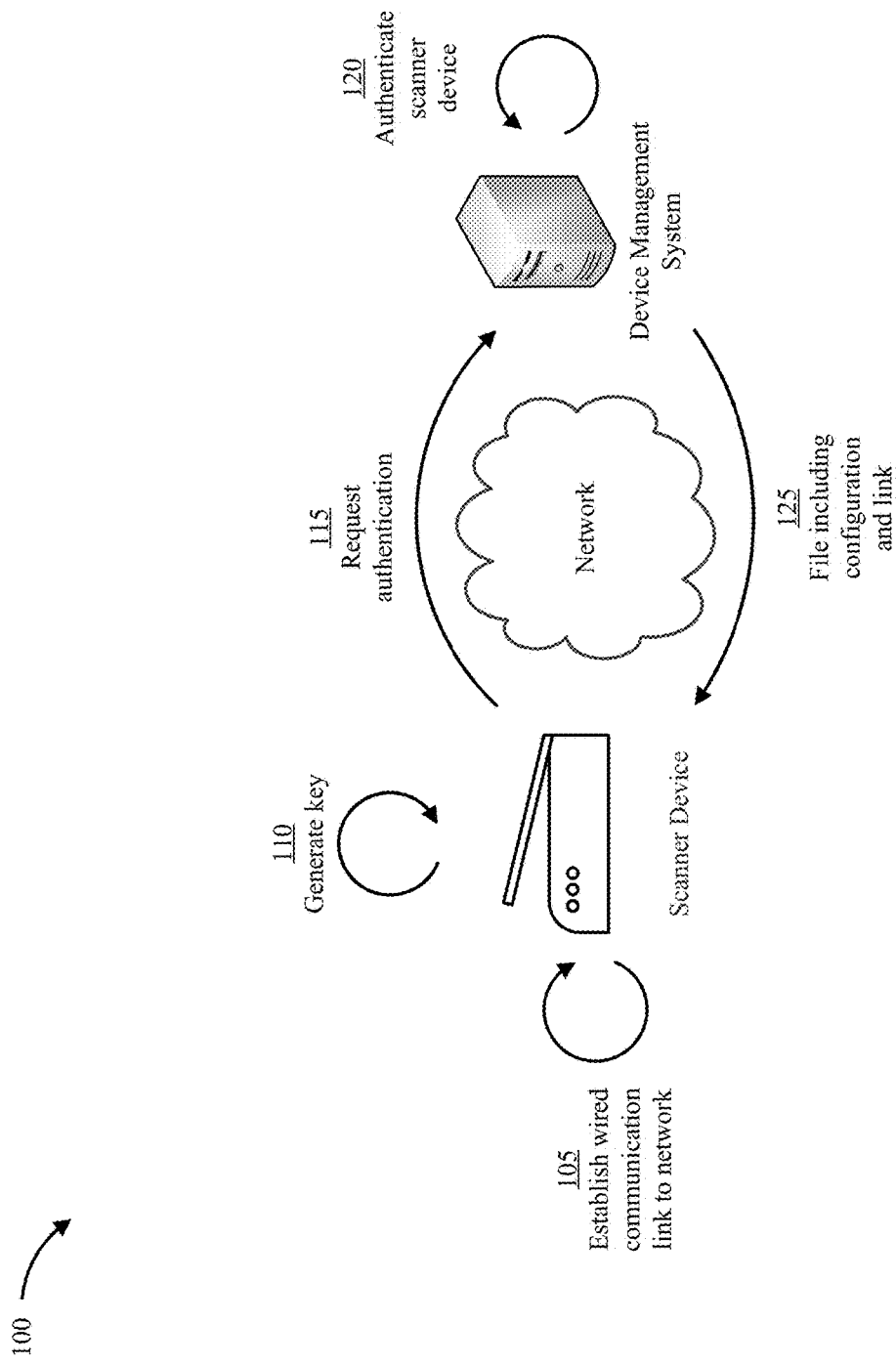
Figure 1B:
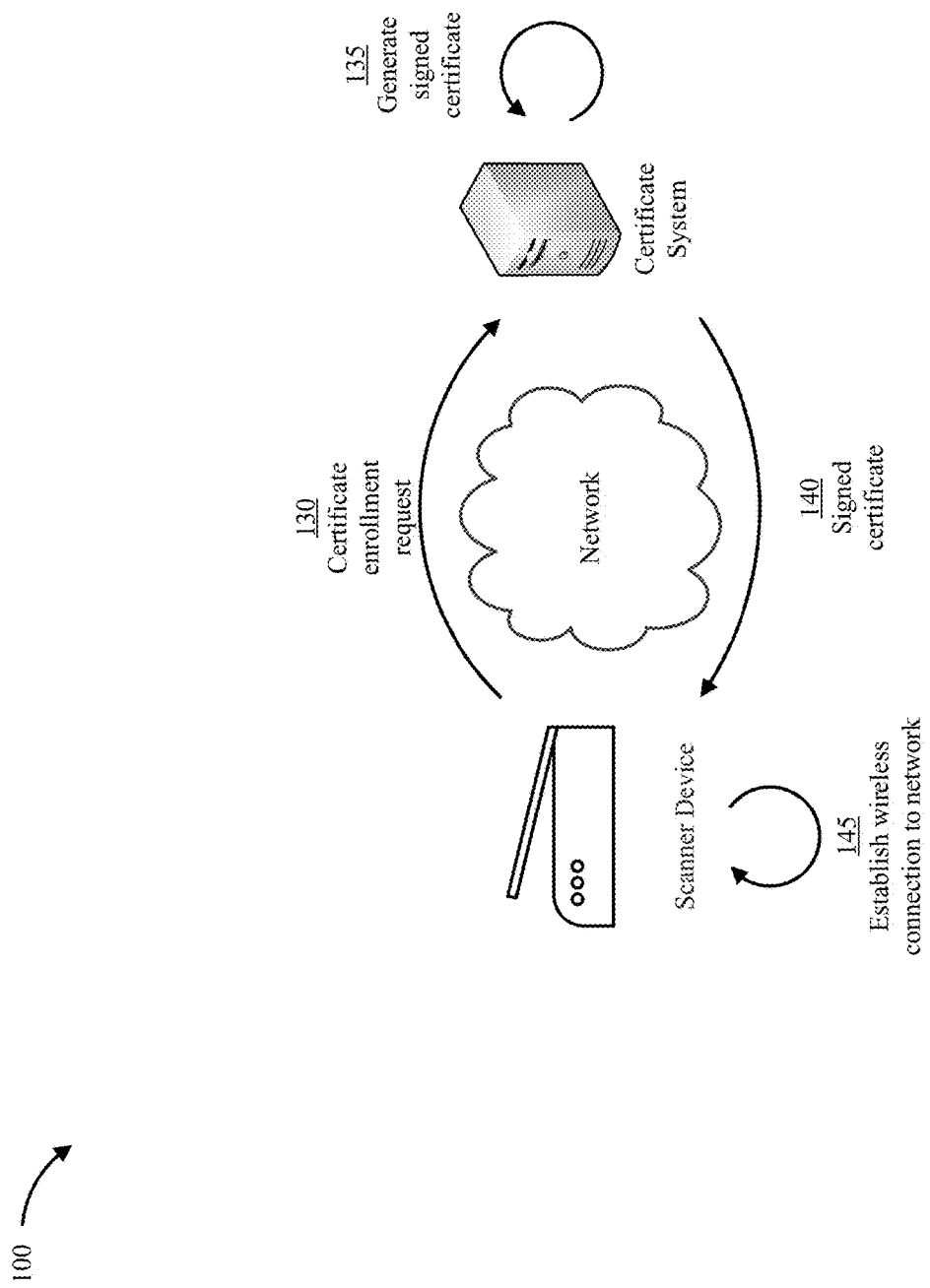
Figure 1C:
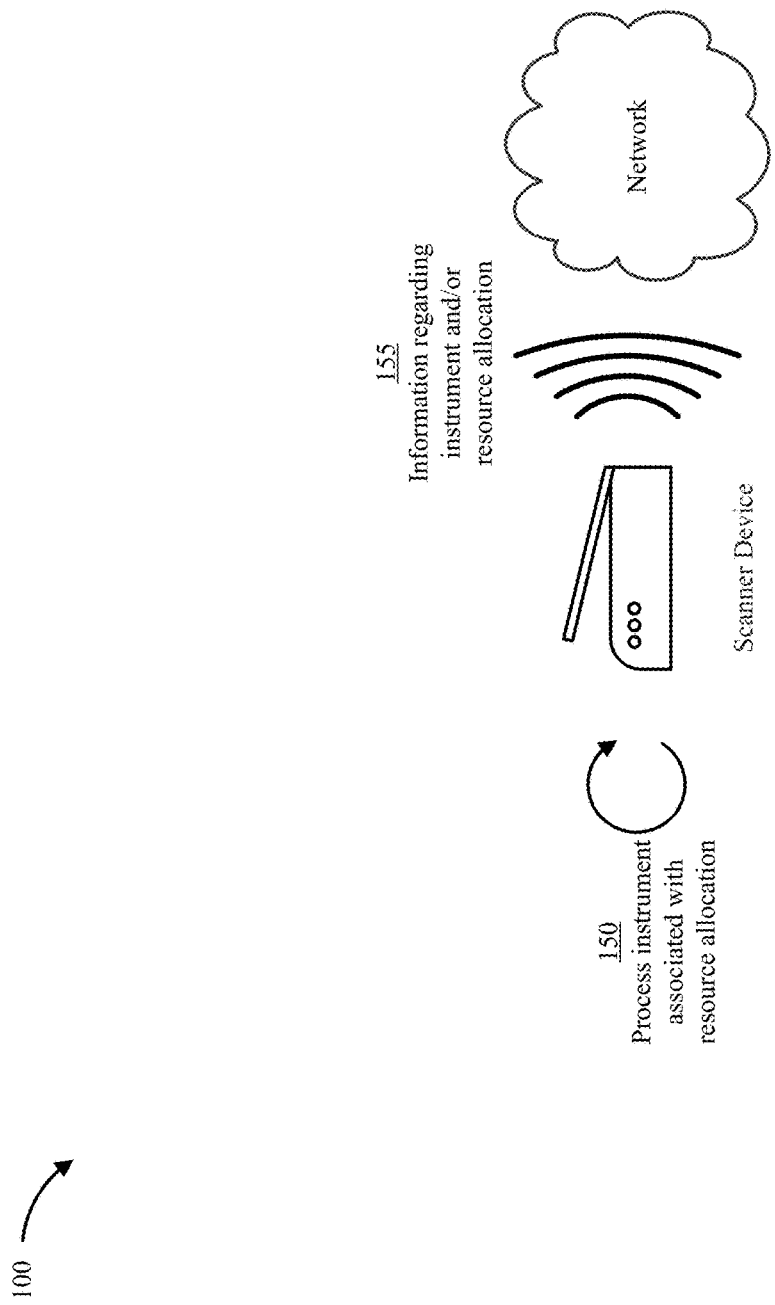
Figure 2:
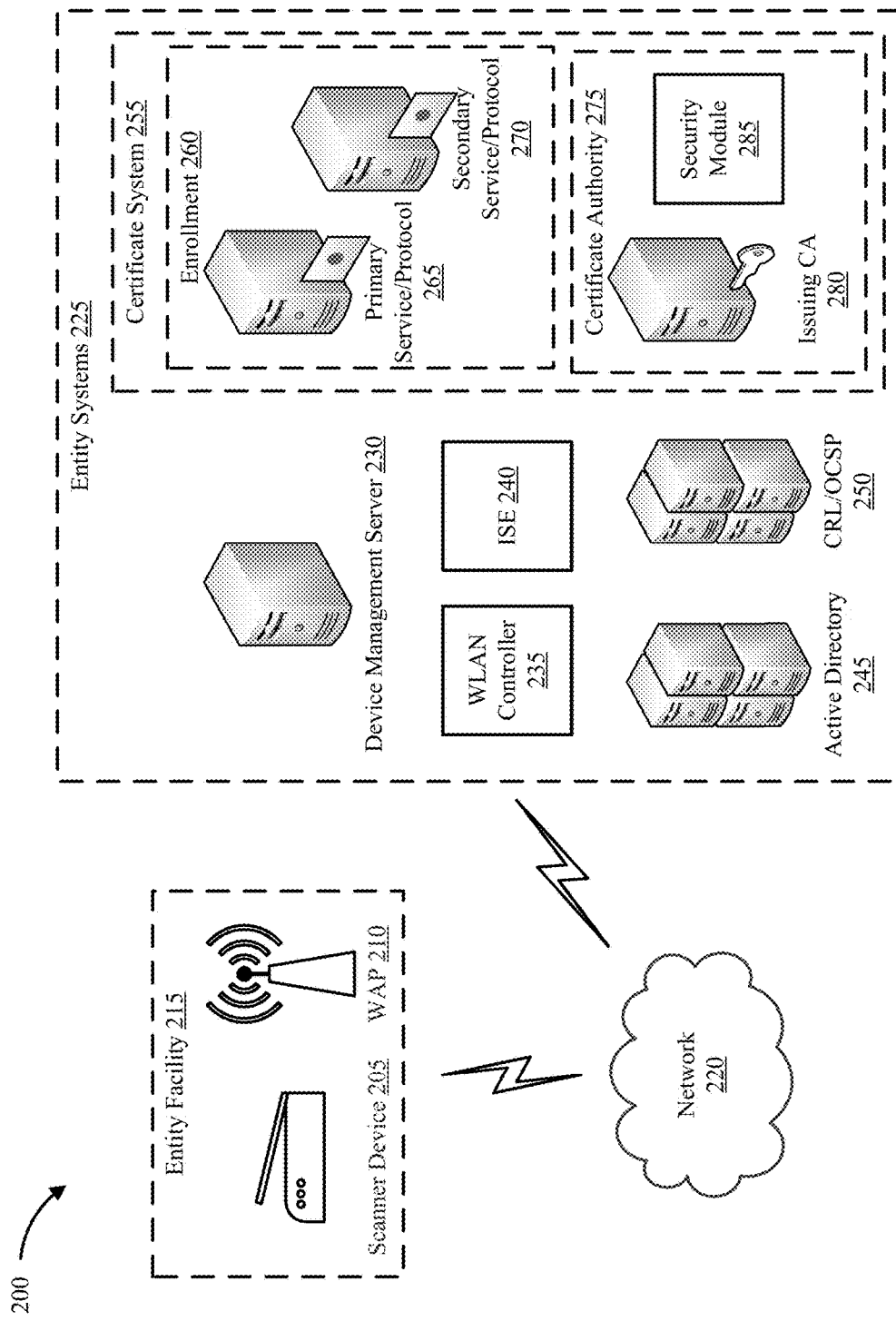
Figure 3:
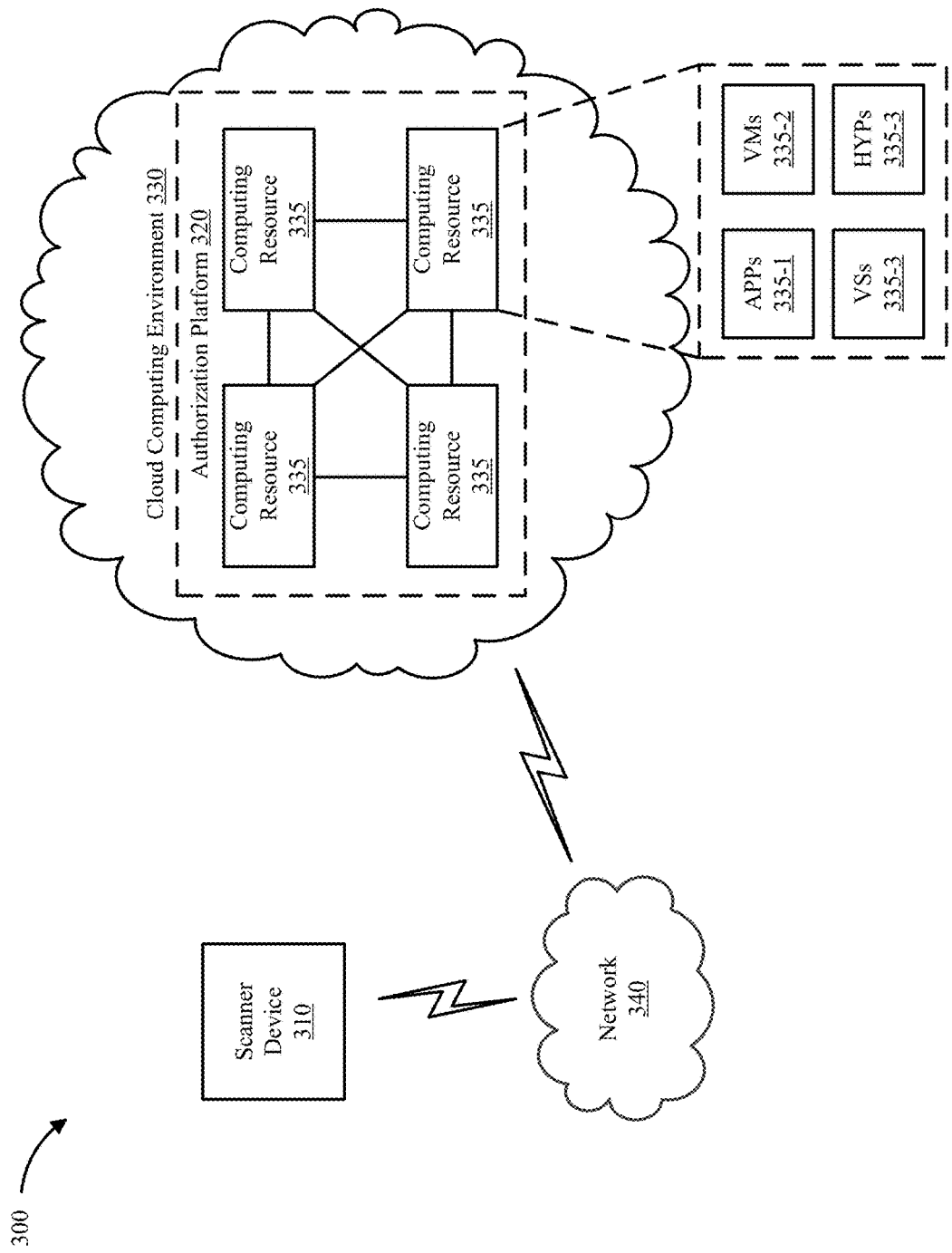
Figure 4:
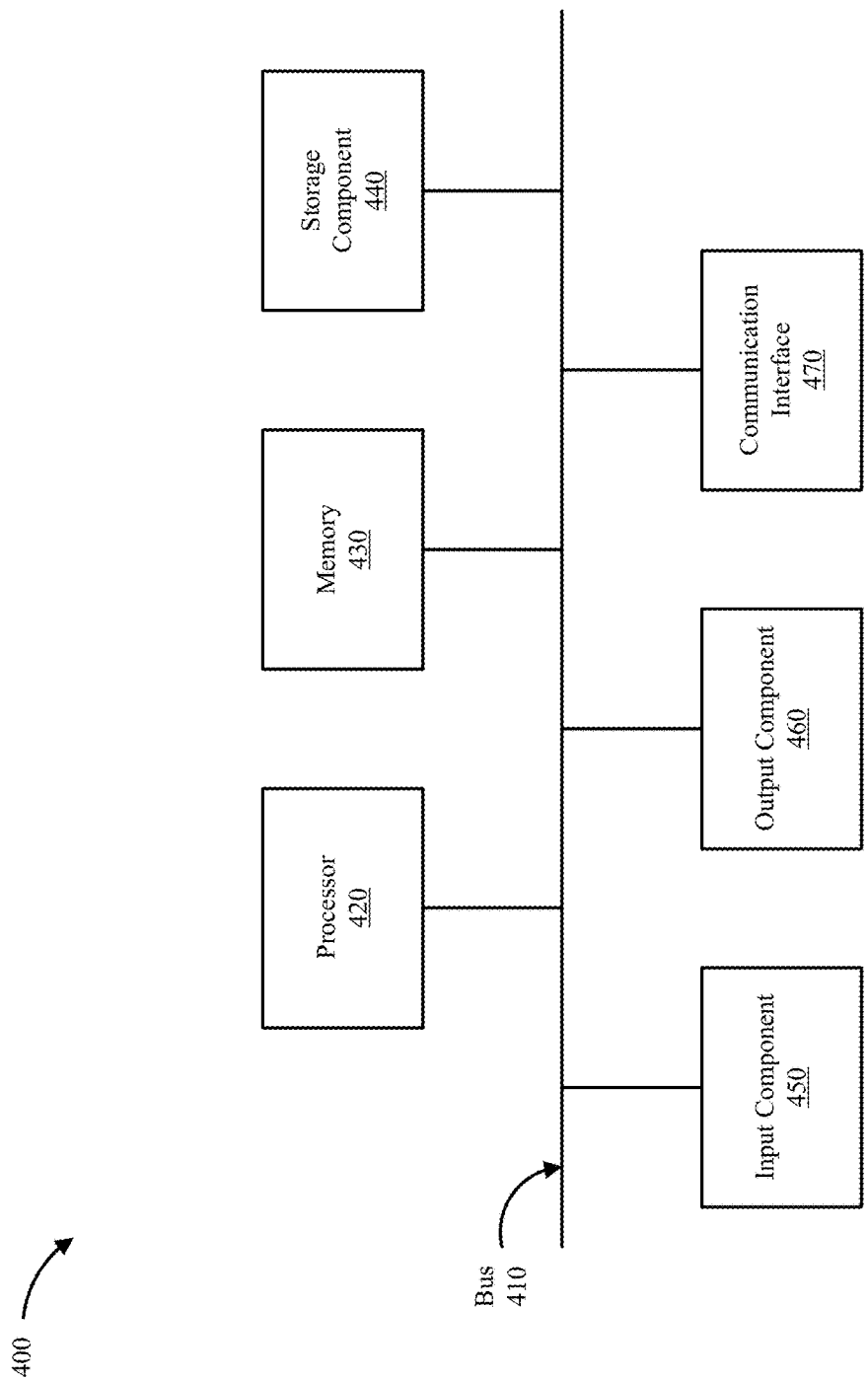
Figure 5:
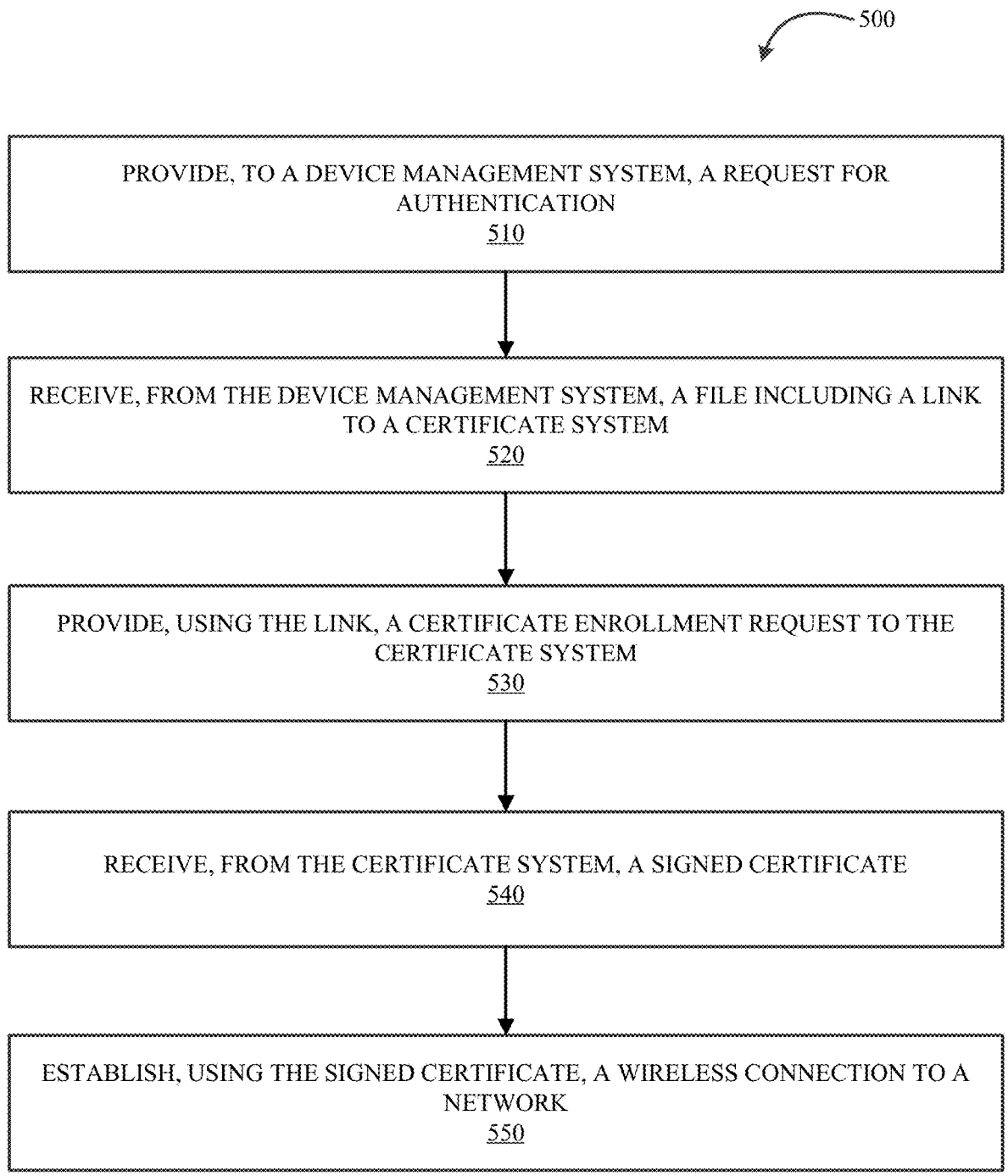

Having thus described embodiments of the invention in general terms, reference will now be made the accompanying drawings, wherein:

FIGS. 1A-1C are diagrams of an example embodiment described herein;

FIG. 2 is a diagram of an example environment in which systems and/or methods described herein may be implemented in accordance with an embodiment of the invention;

FIG. 3 is a diagram of another example environment in which systems and/or methods described herein may be implemented in accordance with an embodiment of the invention;

FIG. 4 is a diagram of example components of one or more devices of FIGS. 1A-1C, 2, and/or 3; and FIG. 5 is a flow chart of an example process associated with example embodiments described herein.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

As used herein, an "entity" may be any institution employing information technology resources and particularly technology infrastructure configured for processing large amounts of data. Typically, the data may be related to products, services, and/or the like offered and/or provided by the entity, customers of the entity, other aspect of the operations of the entity, people who work for the entity, and/or the like. As such, the entity may be an institution, group, association, financial institution, establishment, company, union, authority, merchant, service provider, and/or or the like, employing information technology resources for processing large amounts of data.

As used herein, a "user" may be an individual associated with an entity. As such, in some embodiments, the user may be an individual having past relationships, current relationships or potential future relationships with an entity. In some embodiments, a "user" may be an employee (e.g., an associate, a project manager, a manager, an administrator, an internal operations analyst, and/or the like) of the entity and/or enterprises affiliated with the entity, capable of operating systems described herein. In some embodiments, a "user" may be any individual, another entity, and/or a system who has a relationship with the entity, such as a customer, a prospective customer, and/or the like. In some embodiments, a user may be a system performing one or more tasks described herein.

As used herein, a "resource" may generally refer to objects, products, devices, goods, commodities, services, offers, discounts, currency, cash, cash equivalents, rewards, reward points, benefit rewards, bonus miles, cash back, credits, and/or the like, and/or the ability and opportunity to access and use the same. Some example implementations herein contemplate property held by a user, including property that is stored and/or maintained by a third-party entity. In some example implementations, a resource may be associated with one or more accounts or may be property that is not associated with a specific account. Examples of resources associated with accounts may be accounts that have cash or cash equivalents, commodities, and/or accounts that are funded with or contain property, such as safety deposit boxes containing jewelry, art or other valuables, a trust account that is funded with property, and/or the like.

As used herein, a "source retainer" may generally refer to an account, a system, and/or the like associated with a user and/or a type of resources, such as a checking account, a deposit account, a savings account, a credit account, a rewards account, a rewards points account, a benefit rewards account, a bonus miles account, a cash back account, and/or the like, which may be managed and/or maintained by an entity, such as a financial institution, an electronic resource transfer institution (e.g., a credit card company, a debit card company, a prepaid card company, and/or the like), a credit union, and/or the like. Some example implementations include one or more source retainers associated with a user. Additionally, or alternatively, a source retainer may be associated with an entity (e.g., a merchant, a service provider, and/or the like) and may be managed and/or maintained by another entity (e.g., a financial institution and/or the like).

As used herein, an "allocation" may refer to any transaction, activities, and/or communication between one or more entities, between a user and one or more entities, and/or the like. A resource allocation and/or an allocation of resources may refer to any distribution and/or allocation of resources such as, but not limited to, a payment, processing of funds, purchase of goods or services, a return of goods or services, a payment transaction, a credit transaction, other interactions involving a user's resource or account, and/or the like. In the context of an entity such as a financial institution, a resource allocation and/or an allocation of resources may refer to one or more of a sale of goods and/or services, initiating an automated teller machine (ATM) or online financial session, an account balance inquiry, a rewards transfer, an account money transfer or withdrawal, opening a financial application on a user's computer or mobile device, a user accessing their e-wallet, any other interaction involving the user and/or the user's device that invokes and/or is detectable by the financial institution, and/or the like. In some embodiments, the user may authorize a resource allocation and/or an allocation of resources using a resource allocation instrument (credit cards, debit cards, checks, digital wallets, currency, loyalty points) and/or resource allocation credentials (account numbers, payment instrument identifiers). A resource allocation and/or an allocation of resources may include one or more of the following: renting, selling, and/or leasing goods and/or services (e.g., groceries, stamps, tickets, DVDs, vending machine items, and/or the like); making payments to creditors (e.g., paying monthly bills; paying federal, state, and/or local taxes, and/or the like); sending remittances; loading money onto stored value cards (SVCs) and/or prepaid cards; donating to charities; and/or the like. Unless specifically limited by the context, a "resource allocation," an "allocation of resources," a "resource distribution," a "resource transfer," a "transaction", a "transaction event," and/or a "point of transaction event" may refer to any activity between a user, a merchant, an entity, and/or the like. In some embodiments, a resource allocation and/or an allocation of resources may refer to financial transactions involving direct or indirect movement of funds through traditional paper transaction processing systems (e.g., paper check processing) or through electronic transaction processing systems. In this regard, resource allocations and/or allocations of resources may refer to the user initiating a purchase for a product, service, or the like from a merchant. Typical financial resource allocation and/or financial allocations of resources include point of sale (POS) transactions, automated teller machine (ATM) transactions, person-to-person (P2P) transfers, internet transactions, online shopping, electronic funds transfers between accounts, transactions with a financial institution teller, personal checks, conducting purchases using loyalty/rewards points, and/or the like. When describing that resource transfers or transactions are evaluated, such descriptions may mean that the transaction has already occurred, is in the process of occurring or being processed, or has yet to be processed/posted by one or more financial institutions.

As used herein, "resource allocation instrument" may refer to an electronic payment vehicle, such as a credit card, a debit card, a check, a money order, and/or the like, associated with a source retainer (e.g., a checking account, a deposit account, a savings account, a credit account, and/or the like). In some embodiments, a resource allocation instrument may be provided by a user to initiate, complete, conduct, and/or the like resource allocations and/or allocations of resources. In some embodiments, a resource allocation instrument may not be a "card" and/or a physical object and may instead be account identifying information stored electronically in a user device, such as payment credentials and/or tokens and/or aliases associated with a digital wallet, account identifiers stored by a mobile application, and/or the like.

In some embodiments, the term "module" with respect to an apparatus may refer to a hardware component of the apparatus, a software component of the apparatus, and/or a component of the apparatus that comprises both hardware and software. In some embodiments, the term "chip" may refer to an integrated circuit, a microprocessor, a system-on-a-chip, a microcontroller, and/or the like that may either be integrated into the external apparatus, may be inserted and/or removed from the external apparatus by a user, and/or the like.

As used herein, "authentication credentials" may be any information that may be used to identify a user. For example, a system may prompt a user to enter authentication information such as a username, a password, a personal identification number (PIN), a passcode, biometric information (e.g., voice authentication, a fingerprint, and/or a retina scan), an answer to a security question, a unique intrinsic user activity, such as making a predefined motion with a user device, and/or the like. The authentication information may be used to authenticate the identity of the user (e.g., determine that the authentication information is associated with an account) and/or determine that the user has authority to access an account or system. In some embodiments, the system may be owned and/or operated by an entity. In such embodiments, the entity may employ additional computer systems, such as authentication servers, to validate and certify resources inputted by a plurality of users within the system. The system may further use authentication servers to certify the identity of users of the system, such that other users may verify the identity of the certified users. In some embodiments, the entity may certify the identity of the users. Furthermore, authentication information and/or permission may be assigned to and/or required from a user, application, computing node, computing cluster, and/or the like to access stored data within at least a portion of the system.

As used herein, an "interaction" may refer to any communication between one or more users, one or more entities or institutions, and/or one or more devices, nodes, clusters, and/or systems within the system environment described herein. For example, an interaction may refer to a transfer of data between devices, an accessing of stored data by one or more nodes of a computing cluster, a transmission of a requested task, and/or the like.

As noted, a scanner device may be used to scan instruments associated with resource allocations and transmit information regarding the instruments and/or the resource allocations via a network. For example, an entity may have a scanner device in an entity facility (e.g., an office, a building, a warehouse, a kiosk, a vehicle, a branch of a financial institution, and/or the like). To maintain security of the information regarding the instruments and/or the resource allocations, the scanner device may be connected to the network via a wired communication link. Installing the wired communication link at the entity facility for the scanner device consumes significant financial resources. Additionally, because the installation of the wired communication link consumes significant financial resources, the entity may only install a single scanner device at the entity facility even though multiple users within the entity facility use the scanner device. By only having a single scanner device at the entity facility, the users of the scanner device have reduced efficiency and cannot transmit information regarding instruments and/or resource allocations in real-time and/or near real-time, which consumes additional financial resources as well as computing resources (e.g., processor resources, memory resources, and/or the like) and/or network resources that could be allocated more efficiently if information regarding instruments and/or resource allocations was transmitted in real-time and/or near real-time. Furthermore, if the entity installed multiple scanner devices in the entity facility, installing wired communication links for each of the scanner devices would further increase the financial resources consumed. Additionally, if the entity had multiple entity facilities and installed multiple scanner devices at each of the entity facilities, installing wired communication links for each of the scanner devices at each of the entity facilities would further increase the financial resources consumed.

Some embodiments described herein provide a system, a computer program product, a computer-implemented method, a platform and/or the like for secure resource allocation communication with a network. For example, a system may include a scanner device and a network device (e.g., a wireless antenna, an accessory, a dongle, and/or the like) communicatively connected to the scanner device for enabling the scanner device to communicate wirelessly with the network. The system may establish a wired communication link to the network, generate a key (e.g., a unique identifier, a password, a serial number, and/or the like), and request authentication from a device management system. The device management system may authenticate the system (e.g., the scanner device and the network device) using an identity services engine (ISE), an active directory, a certificate revocation list (CRL), an online certificate status protocol (OCSP), an allowlist, a media access control (MAC) address, a MAC authentication bypass (MAB) protocol, a remote authentication dial-in user service (RADIUS) protocol, a dynamic host configuration protocol (DHCP), a domain name system (DNS), a hypertext transfer protocol secure (HTTPS), and/or the like. Based on authenticating the system, the device management system may provide, to the system, a file including a configuration and a link (e.g., a uniform resource locator (URL) and/or the like) to a certificate system. The system may adjust its configuration based on the configuration in the file (e.g., to use ports, protocols, and/or the like identified by the configuration). The system may connect, using the link, to the certificate system and submit a certificate enrollment request. The certificate system may include a network device enrollment service (NDES), a simple certificate enrollment protocol (SCEP), and/or the like and a certificate authority (CA). The certificate system may process the certificate enrollment request, generate a signed certificate, and provide the signed certificate to the system. The system may then establish, using the signed certificate, a wireless connection to the network.

The network may restrict the system from accessing any devices, systems, data, and/or the like on the network other than the devices, systems, data, and/or the like required for the system to obtain a signed certificate (e.g., device management system, the certificate system, and/or the like). Restricting the system's access to the network, authenticating the system before providing the system with the link, and generating the signed certificate using the certificate system ensures the security of the network before the scanner device receives the signed certificate. Additionally, using a wired connection to authenticate the system and provide the signed certificate (e.g., during an onboarding process, before deployment at an entity facility, and/or the like) reduces a likelihood of unauthorized attempts to authenticate systems, devices, and/or the like. Furthermore, by using the signed certificate to establish the wireless connection, the system ensures, to the network, that the system is authorized to access the network. In some embodiments, the signed certificate may expire after a time period, and the system may provide a certificate renewal request to the certificate system. Causing the signed certificate to expire and requiring renewal of the signed certificate further ensures the security of the network.

Permitting the system to establish a wireless connection to the network, rather than a wired connection, conserves the financial resources that would otherwise be consumed by installing wired communication links for each scanner device. Additionally, by using a wireless connection, multiple scanner devices may be deployed in an entity facility. Deploying multiple scanner devices in an entity facility increases user efficiency and conserves computing resources and/or network resources by permitting transmission of information regarding instruments and/or resource allocations in real-time and/or near real-time. Furthermore, users of the scanner devices may move the scanner devices throughout the entity facility to increase efficiency, improve customer satisfaction, and/or the like.

FIGS. 1A-1C are diagrams of one or more example embodiments 100 described herein. As shown in FIGS. 1A-1C, the example embodiment 100 includes a scanner device, a network, a device management system, and a certificate system. In some embodiments, the scanner device, the network, the device management system, and the certificate system may be associated with an entity. Additionally, or alternatively, the scanner device may be onboarded (e.g., in FIGS. 1A-1B) and then deployed in an entity facility to scan instruments associated with resource allocations and transmit information regarding the instruments and/or the resource allocations via the network. In some embodiments, an authorization platform (e.g., as described herein with respect to FIG. 3) may include the device management system and/or the certificate system.

As shown in FIG. 1A, and by reference number 105, the scanner device may establish a wired communication link to the network. For example, a user (e.g., an employee of the entity, a contractor of the entity, and/or the like) may connect a hardwire (e.g., an ethernet cable, a universal serial bus (USB) cable connected to a computing device, and/or the like) to the scanner device, and a communication interface of the scanner device may establish a communication link with the network.

As also shown in FIG. 1A, and by reference number 110, the scanner device may generate a key. In some embodiments, the scanner device may generate the key based on information associated with the scanner device. For example, the key may be based on a unique identifier of the scanner device, such as an alphanumeric code (e.g., a name and/or number assigned to the scanner device by the entity and/or the like), a unique identifier provided by a manufacturer of the scanner device (e.g., a serial number and/or the like), a model name and/or number of the scanner device, and/or the like. In some embodiments, the key distinguishes the scanner device from other scanner devices.

As shown in FIG. 1A, and by reference number 115, the scanner device may request authentication (e.g., via the network) from the device management system. In some embodiments, the scanner device may provide, to the device management system, a request for authentication. For example, the scanner device may transmit information associated with the scanner device, which the device management system may use to authenticate the scanner device. In some embodiments, the request for authentication may include the key generated by the scanner device. Additionally, or alternatively, the request for authentication may include a unique identifier of the scanner device, such as an alphanumeric code (e.g., a name and/or number assigned to the scanner device by the entity and/or the like), a unique identifier provided by a manufacturer of the scanner device (e.g., a serial number and/or the like), a model name and/or number of the scanner device, and/or the like.

In some embodiments, the scanner device may be configured to connect to the device management system after establishing the wired communication link to the network. For example, the scanner device may be configured to automatically connect to the device management system (e.g., to request authentication, to check for an updated configuration, and/or the like).

As shown in FIG. 1A, and by reference number 120, the device management system may authenticate the scanner device. In some embodiments, the device management system may receive the request for authentication, and authenticate the scanner device based on the request. For example, the device management system may authenticate the scanner device based on information in the request (e.g., the key and/or the like), information regarding the scanner device (e.g., a MAC address of the scanner device, a name of the scanner device, and/or the like). In some embodiments, the device management system may authenticate the scanner device using MAB protocol, ISE, an active directory, CRL, OCSP, an allowlist, MAC, RADIUS, DHCP, DNS, HTTPS, and/or the like. In some embodiments, the request for authentication may include a unique identifier of the scanner device, such as an alphanumeric code (e.g., a name and/or number assigned to the scanner device by the entity and/or the like), a unique identifier provided by a manufacturer of the scanner device (e.g., a serial number and/or the like), a model name and/or number of the scanner device, and/or the like, and the device management system may authenticate the scanner device by performing a unique identifier lookup to confirm that the scanner device is authorized to connect to the network.

In some embodiments, the device management system may authenticate the scanner device for communication on the network for a time period and may revoke authentication of the scanner device after the time period. For example, the device management system may authenticate the scanner device for communication on the network for a time period (e.g., thirty minutes, an hour, and/or the like) to permit time for an onboarding process. In such an example, the device management system may revoke authentication of the scanner device after the time period expires such that the scanner device may not communicate with other systems and/or devices on the network after the time period expires. After the authentication is revoked, the scanner device may re-initiate an onboarding process by re-requesting authentication from the device management system.

As shown in FIG. 1A, and by reference number 125, the device management system may provide, to the scanner device, (e.g., via the network) a file including a configuration and a link. In some embodiments, the configuration may be configuration instructions, and the scanner device may adjust, based on the configuration instructions, a configuration of the scanner device. For example, the file may be a configuration file, and the scanner device may install the configuration file. In some embodiments, the configuration file may include one or more ports and/or protocols for the scanner device to use to establish a wireless connection with the network.

In some embodiments, the link may be a link (e.g., a URL and/or the like) to the certificate system. For example, the file may be a configuration file including the link, and the scanner device may install the configuration file and connect (e.g., via the network) to the certificate system using the link.

Additionally, or alternatively, the device management system may generate a key for the scanner device. For example, the device management system may receive the request for authentication, authenticate the scanner device based on the request, generate, based on authenticating the scanner device, a key for the scanner device, and provide the key (e.g., in the file) to the scanner device. In some embodiments, the key may be used for encryption and/or decryption (e.g., encryption and/or decryption of a certificate, encryption and/or decryption of a signature, and/or the like).

In some embodiments, the device management system may generate a certificate for the scanner device. For example, the device management system may receive the request for authentication, authenticate the scanner device based on the request, generate, based on authenticating the scanner device, a certificate for the scanner device, and provide the certificate (e.g., in the file) to the scanner device. In some embodiments, the certificate may be used to confirm authentication of the scanner device to the network.

As shown in FIG. 1B, and by reference number 130, the scanner device may provide, to the certificate system, (e.g., via the network) a certificate enrollment request. In some embodiments, the scanner device may provide the certificate enrollment request to the certificate system using the link provided by the device management system. In some embodiments, the certificate system may include a certificate enrollment server for receiving certificate enrollment requests. For example, the certificate system may include one or more NDES and/or SCEP servers and a CA, and the scanner device may connect to the one or more NDES and/or SCEP servers using the link. In some embodiments, the scanner device may generate a certificate and the certificate enrollment request may include the certificate.

As shown in FIG. 1B, and by reference number 135, the certificate system may generate a signed certificate for the scanner device. In some embodiments, the certificate system may include a certificate enrollment server for receiving certificate enrollment requests, a CA for receiving certificate signing requests from the certificate enrollment server and generating signed certificates, a security module for encrypting signatures on certificates, and/or the like. For example, the one or more NDES and/or SCEP servers may provide a certificate signing request (CSR) to the CA, and the CA may sign a certificate (e.g., using a hardware security module (HSM) and/or the like). In some embodiments, the CSR may include the key generated by the scanner device. Additionally, or alternatively, the certificate system may generate the signed certificate using the key. For example, the CA may sign the certificate, and may, using an HSM, encrypt the signature and/or the signed certificate using the key. In some embodiments, the certificate system may generate the signed certificate based on a unique identifier of the scanner device, such as an alphanumeric code (e.g., a name and/or number assigned to the scanner device by the entity and/or the like), a unique identifier provided by a manufacturer of the scanner device (e.g., a serial number and/or the like), a model name and/or number of the scanner device, and/or the like.

As show in FIG. 1B, and by reference number 140, the certificate system may provide, to the scanner device, (e.g., via the network) the signed certificate. For example, the CA may provide the signed certificate to the one or more NDES and/or SCEP servers, and the one or more NDES and/or SCEP servers may provide the signed certificate to the scanner device. In some embodiments, the scanner device may receive the signed certificate from the certificate system (e.g., from the one or more NDES and/or SCEP servers). In some embodiments, the scanner device may store the signed certificate (e.g., in memory and/or the like).

As noted with respect to FIG. 1A and reference number 105, the scanner device may establish a wired communication link to the network. In some embodiments, the information provided by the scanner device through the network to the device management system and the certificate system and the information received by the scanner device through the network may be provided and/or received using the wired communication link. In this regard, using a wired connection to provide and/or receive information through the network until the scanner device obtains a signed certificate increases the security of the network. Furthermore, the network may be configured to restrict the scanner device from accessing any devices, systems, data, and/or the like on the network other than the devices, systems, data, and/or the like required for the scanner device to obtain a signed certificate (e.g., device management system, the certificate system, and/or the like) until the scanner device obtains a signed certificate. In this way, the scanner device, the network, the device management system, and/or the certificate system ensure the security of the network.

In some embodiments, the certificate system may authenticate and/or provide certificates for other devices that attempt to connect to the network (e.g., all devices attempting to connect to the network). For example, the network may be configured to permit devices without a signed certificate to access only the device management system and the certificate system. Additionally, or alternatively, the network may be configured to restrict devices attempting to connect to the network from accessing any devices, systems, data, and/or the like on the network other than the devices, systems, data, and/or the like required for the device to obtain a signed certificate (e.g., device management system, the certificate system, and/or the like) until the device obtains a signed certificate.

As shown in FIG. 1B, and by reference number 145, the scanner device may establish a wireless connection to the network. In some embodiments, the scanner device may establish the wireless connection to the network using the signed certificate. For example, the scanner device may use the signed certificate to connect to the network, and the network, based on the signed certificate, may provide the scanner device with access to additional devices, systems, data, and/or the like on the network as compared to the access provided before the scanner device obtained the signed certificate. In some embodiments, the network, based on the signed certificate, may provide the scanner device with access to predetermined devices, systems, data, and/or the like on the network (e.g., predetermined by the entity, predetermined by a user associated with the entity, predetermined by a configuration of the network, and/or the like).

As shown in FIG. 1C, and by reference number 150, the scanner device may process an instrument associated with a resource allocation. In some embodiments, the scanner device may scan an instrument associated with a resource allocation. Additionally, or alternatively, the scanner device may scan a resource allocation instrument, capture an image of the resource allocation instrument, process the image to determine a source retainer associated with the resource allocation instrument, and/or the like. In some embodiments, the scanner device may cause, based on one or more other actions (e.g., determining a source retainer associated with an instrument, printing information on an instrument, and/or the like), resources to be allocated from a source retainer to another source retainer.

As shown in FIG. 1C, and by reference number 155, the scanner device may provide (e.g., transmit and/or the like) information regarding the instrument and/or the resource allocation using the wireless connection to the network. For example, the scanner device may provide an identifier of a source retainer associated with the instrument, an amount of resources associated with the instrument and/or the resource allocation, information regarding a user associated with the instrument, a date associated with the instrument, and/or the like. In some embodiments, the scanner device may provide the instrument and/or the resource allocation to one or more systems maintained by an entity (e.g., for processing information associated with resource allocations, for allocating resources among source retainers, and/or the like) and connected to the network.

In some embodiments, the signed certificate may expire (e.g., after a time period has passed since the signed certificate was provided, renewed, and/or the like by the certificate system and/or the like) such that the scanner device may no longer use a wireless connection to access the network (e.g., to improve safety of the network and/or the like). For example, the network may be configured to restrict the scanner device from accessing any devices, systems, data, and/or the like on the network other than the devices, systems, data, and/or the like required for the system to renew the signed certificate (e.g., device management system, the certificate system, and/or the like) until the scanner device renews the signed certificate. In such embodiments, the scanner device may provide, to the certificate system, (e.g., via the wireless connection), a certificate renewal request. Additionally, or alternatively, the scanner device may receive, from the certificate system, (e.g., via the wireless connection), confirmation of renewal of the signed certificate.

As indicated above, FIGS. 1A-1C are provided as one or more examples. Other examples may differ from what is described with regard to FIGS. 1A-1C. For example, there may be additional devices and/or networks, fewer devices and/or networks, different devices and/or networks, or differently arranged devices and/or networks than those shown in FIGS. 1A-1C. Furthermore, two or more devices shown in FIGS. 1A-1C may be implemented within a single device, or a single device shown in FIGS. 1A-1C may be implemented as multiple and/or distributed devices. Additionally, or alternatively, a set of devices (e.g., one or more devices) of example embodiment 100 may perform one or more functions described as being performed by another set of devices of example embodiment 100.

FIG. 2 is a diagram of an example environment 200 in which systems and/or methods described herein may be implemented in accordance with an embodiment of the invention. As shown in FIG. 2, environment 200 may include a scanner device 205 and a wireless access point (WAP) 210 located at an entity facility 215, a network 220, and entity systems 225 including a device management server 230, a wireless local area network (WLAN) controller 235, an ISE 240, an active directory 245, a CRL/OCSP 250, and a certificate system 255. As further shown in FIG. 2, the certificate system 255 may include an enrollment portion 260 including a primary service/protocol server 265 and a secondary service/protocol server 270 as well as a certificate authority portion 275 including an issuing CA 280 and a security module 285 (e.g., an online HSM and/or the like).

In some embodiments, the scanner device 205 includes one or more devices capable of receiving, generating, storing, processing, displaying, providing, scanning, and/or printing information associated with resource allocation instruments, resources, resource allocations, source retainers, keys, configurations, links, certificates, and/or the like, as described herein. For example, the scanner device 205 may include one or more sensors for capturing images of resource allocation instruments, resources, documents, and/or the like. The one or more sensors may include a camera, an image sensor, an infrared camera, a laser sensor, and/or any other suitable sensor that may capture one or more images and/or data. Additionally, or alternatively, the scanner device may include one or more printing mechanisms for printing information (e.g., letters, text, numbers, images, and/or the like) on resource allocation instruments, resources, documents, and/or the like.

In some embodiments, the WAP 210 includes one or more devices capable of receiving, storing, processing, and/or providing information associated with resource allocation instruments, resources, resource allocations, source retainers, and/or the like as described herein. For example, the WAP 210 may include one or more networking hardware devices that allow other devices with wireless communication interfaces to connect to a wired network. In some embodiments, the WAP 210 may connect to and/or include a router. Additionally, or alternatively, the WAP 210 may connect directly (e.g., via ethernet) to a wired network (e.g., a local area network (LAN) and/or the like) and may provide wireless connections using wireless LAN technology (e.g., Wi-Fi and/or the like).

In some embodiments, the network 220 includes one or more wired and/or wireless networks. For example, network 220 may include a cellular network (e.g., a long-term evolution (LTE) network, a code division multiple access (CDMA) network, a 3G network, a 4G network, a 5G network, another type of next generation network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks. In some embodiments, the network 220 may be managed and/or maintained by an entity (e.g., a financial institution and/or the like).

In some embodiments, the entity systems 225 may include one or more systems, servers, platforms, applications, and/or the like managed and/or maintained by an entity and/or its service providers. For example, the entity systems 225 may include one or more systems, servers, platforms, applications, and/or the like of an entity's data center.

In some embodiments, the device management server 230 may include one or more devices capable of receiving, generating, storing, processing, displaying, and/or providing information associated with scanner devices, keys, configurations, links, and/or the like, as described herein. For example, the device management server 230 may include one or more server systems and/or devices configured to provide updated configuration files to scanner devices.

In some embodiments, the WLAN controller 235 may include one or more devices capable of managing, configuring, and/or the like a plurality of WAPs including WAP 210. For example, the WLAN controller 235 may configure the WAP 210 to prevent the scanner device 205 from wirelessly accessing the network without a signed certificate.

In some embodiments, the ISE 240 may include one or more devices capable of providing, executing, monitoring, managing, and/or the like an identity and/or access control policy platform. For example, the ISE 240 may enable an entity to enforce compliance, enhance infrastructure security, streamline service operations, and/or the like. In some embodiments, the ISE 240 may verify the scanner device 205 based on the active directory 245, identify, based on verifying the scanner device 205, an endpoint characteristics, and provide, to the scanner device 205, a new role permitting the scanner device 205 to communicate with the device management server 230 (e.g., for a time period).

In some embodiments, the active directory 245 may include one or more devices capable of receiving, storing, providing, and/or the like data associated with other devices, such as a plurality of scanner devices. For example, the active directory 245 may include one or more data structures including service accounts, device characteristics, device configurations, and/or the like.

In some embodiments, the CRL/OCSP 250 may include one or more devices capable of receiving, storing, providing, and/or the like data associated with other devices, such as a plurality of scanner devices. For example, the CRL/OCSP 250 may include one or more data structures including certificates, expiration dates of certificates, and/or the like. Additionally, or alternatively, the CRL/OCSP 250 may provide a protocol for obtaining revocation status of a certificate and/or the like.

In some embodiments, the certificate system 255 may include one or more devices capable of receiving, generating, storing, processing, displaying, and/or providing information regarding certificates, as described herein. For example, the certificate system 255 may include one or more devices providing a public key infrastructure (PKI). For example, the certificate system 255 may include one or more roles, policies, hardware, software, and/or procedures for creating, managing, distributing, using, storing, and/or revoking certificates. Additionally, or alternatively, the certificate system may manage encryption (e.g., of public keys).

In some embodiments, the enrollment portion 260 of the certificate system 255 includes one or more devices capable of receiving, generating, storing, processing, displaying, and/or providing information regarding certificate signing requests, certificates, signed certificates, and/or the like, as described herein. For example, and as shown in FIG. 2, the enrollment portion 260 of the certificate system 255 may include the primary service/protocol server 265 and the secondary service/protocol server 270.

In some embodiments, the certificate authority portion 275 of the certificate system 255 includes one or more devices capable of receiving, generating, storing, processing, displaying, and/or providing information regarding certificate signing requests, certificates, signed certificates, encrypted signatures, encrypted keys, and/or the like, as described herein. For example, and as shown in FIG. 2, the certificate authority portion 275 of the certificate system 255 may include the issuing certificate authority (CA) 280 and the security module 285. In some embodiments, the security module 285 may include an online security module (e.g., a security module hosted on a network and/or the like), a hardware security module (HSM), such as a physical computing device (e.g., a plug-in card, an external device, and/or the like) capable of safeguarding and/or managing digital keys, performing encryption and/or decryption functions for digital signatures, authentication, and/or other cryptographic functions.

The number and arrangement of devices and networks shown in FIG. 2 are provided as one or more examples. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

FIG. 3 is a diagram of another example environment 200 in which systems and/or methods described herein may be implemented in accordance with an embodiment of the invention. As shown in FIG. 3, environment 300 may include a scanner device 310, an authorization platform 320, a cloud computing environment 330 with computing resources 335, and a network 340.

In some embodiments, the scanner device 310 includes one or more devices capable of receiving, generating, storing, processing, displaying, providing, scanning, and/or printing information associated with resource allocation instruments, resources, resource allocations, source retainers, keys, configurations, links, certificate signing requests, certificates, signed certificates, encrypted signatures, encrypted keys, and/or the like, as described herein. For example, the scanner device 205 may include one or more sensors for capturing images of resource allocation instruments, resources, documents, and/or the like. The one or more sensors may include a camera, an image sensor, an infrared camera, a laser sensor, and/or any other suitable sensor that may capture one or more images and/or data. Additionally, or alternatively, the scanner device may include one or more printing mechanisms for printing information (e.g., letters, text, numbers, images, and/or the like) on resource allocation instruments, resources, documents, and/or the like.

In some embodiments, the authorization platform 320 includes one or more computing resources assigned to receiving, verifying, generating, storing, processing, displaying, and/or providing information associated with resource allocation instruments, resources, resource allocations, source retainers, keys, configurations, links, certificates, and/or the like, as described herein. For example, the authorization platform 320 may be a platform implemented by the cloud computing environment 330 that may receive, verify, generate, store, process, display, and/or provide information associated with resource allocation instruments, resources, resource allocations, source retainers, keys, configurations, links, certificates, and/or the like. In some embodiments, the authorization platform 320 may be implemented by computing resources 335 of the cloud computing environment 330.

Authorization platform 320 may include a server device or a group of server devices. In some embodiments, authorization platform 320 may be hosted in cloud computing environment 330. Notably, while embodiments described herein describe authorization platform 320 as being hosted in cloud computing environment 330, in some embodiments, authorization platform 320 may be non-cloud-based or may be partially cloud-based.

Cloud computing environment 330 includes an environment that delivers computing as a service, whereby shared resources, services, etc. may be provided to other devices, such as the scanner device 310. Cloud computing environment 330 may provide computation, software, data access, storage, and/or other services that do not require end-user knowledge of a physical location and configuration of a system and/or a device that delivers the services. As shown, cloud computing environment 330 may include authorization platform 320 and computing resource 335.

Computing resource 335 includes one or more personal computers, workstation computers, server devices, or another type of computation and/or communication device. In some embodiments, computing resource 335 may host authorization platform 320. The cloud resources may include compute instances executing in computing resource 335, storage devices provided in computing resource 335, data transfer devices provided by computing resource 335, etc. In some embodiments, computing resource 335 may communicate with other computing resources 335 via wired connections, wireless connections, or a combination of wired and wireless connections.

As further shown in FIG. 3, computing resource 335 may include a group of cloud resources, such as one or more applications ("APPs") 335-1, one or more virtual machines ("VMs") 335-2, virtualized storage ("VSs") 335-3, one or more hypervisors ("HYPs") 335-4, or the like.

Application 335-1 includes one or more software applications that may be provided to or accessed by devices, such as the scanner device 310. Application 335-1 may eliminate a need to install and execute the software applications on devices, such as the scanner device 310. For example, application 335-1 may include software associated with authorization platform 320 and/or any other software capable of being provided via cloud computing environment 330. In some embodiments, one application 335-1 may send and/or receive information to and/or from one or more other applications 335-1, via virtual machine 335-2.

Virtual machine 335-2 includes a software implementation of a machine (e.g., a computer) that executes programs like a physical machine. Virtual machine 335-2 may be either a system virtual machine or a process virtual machine, depending upon use and degree of correspondence to any real machine by virtual machine 335-2. A system virtual machine may provide a complete system platform that supports execution of a complete operating system ("OS"). A process virtual machine may execute a single program and may support a single process. In some embodiments, virtual machine 335-2 may execute on behalf of a user (e.g., devices, such as the scanner device 310, the authorization platform 320), and may manage infrastructure of cloud computing environment 330, such as data management, synchronization, or long-duration data transfers.

Virtualized storage 335-3 includes one or more storage systems and/or one or more devices that use virtualization techniques within the storage systems or devices of computing resource 335. In some embodiments, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored.

This may enable optimization of storage use, server consolidation, and/or performance of non-disruptive file migrations.

Hypervisor 335-4 provides hardware virtualization techniques that allow multiple operating systems (e.g., "guest operating systems") to execute concurrently on a host computer, such as computing resource 335. Hypervisor 335-4 may present a virtual operating platform to the guest operating systems and may manage the execution of the guest operating systems. Multiple instances of a variety of operating systems may share virtualized hardware resources.

Network 340 includes one or more wired and/or wireless networks. For example, network 340 may include a cellular network (e.g., a long-term evolution (LTE) network, a code division multiple access (CDMA) network, a 3G network, a 4G network, a 5G network, another type of next generation network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 3 are provided as one or more examples. In practice, there may be additional devices and/or networks, fewer devices and/or networks, different devices and/or networks, or differently arranged devices and/or networks than those shown in FIG. 3. Furthermore, two or more devices shown in FIG. 3 may be implemented within a single device, or a single device shown in FIG. 3 may be implemented as multiple, distributed devices. Additionally, or alternatively, a set of devices (e.g., one or more devices) of environment 300 may perform one or more functions described as being performed by another set of devices of environment 300.

FIG. 4 is a diagram of example components of a device 400. In some embodiments, device 400 may correspond to the scanner device, the device management system and/or the certificate system of FIGS. 1A-1C. Additionally, or alternatively, the scanner device, the device management system and/or the certificate system of FIGS. 1A-1C may include one or more devices 400 and/or one or more components of device 400. In some embodiments, device 400 may correspond to the scanner device 205, the WAP 210, the entity systems 225, the device management server 230, the WLAN controller 235, the ISE 240, the active directory 245, the CRL/OCSP 250, the certificate system 255, the enrollment portion 260, the primary service/protocol 265, the secondary service/protocol 270, the certificate authority 275, the issuing CA 280, and/or the security module of FIG. 2. Additionally, or alternatively, the scanner device 205, the WAP 210, the entity systems 225, the device management server 230, the WLAN controller 235, the ISE 240, the active directory 245, the CRL/OCSP 250, the certificate system 255, the enrollment portion 260, the primary service/protocol 265, the secondary service/protocol 270, the certificate authority 275, the issuing CA 280, and/or the security module may include one or more devices 400 and/or one or more components of device 400. In some embodiments, device 400 may correspond to the scanner device 310 and/or the authorization platform 320 of FIG. 3. Additionally, or alternatively, the scanner device 310 and/or the authorization platform 320 may include one or more devices 400 and/or one or more components of device 400. As shown in FIG. 4, device 400 may include a bus 410, a processor 420, a memory 430, a storage component 440, an input component 450, an output component 460, and a communication interface 470.

Bus 410 includes a component that permits communication among multiple components of device 400. Processor 420 is implemented in hardware, firmware, and/or a combination of hardware and software. Processor 420 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 420 includes one or more processors capable of being programmed to perform a function. Memory 430 includes a random access memory (RAM), a read only memory (ROM), and/or another type of dynamic or static storage device (e.g., a flash memory, a magnetic memory, and/or an optical memory) that stores information and/or instructions for use by processor 420.

Storage component 440 stores information and/or software related to the operation and use of device 400. For example, storage component 440 may include a hard disk (e.g., a magnetic disk, an optical disk, and/or a magneto-optic disk), a solid state drive (SSD), a compact disc (CD), a digital versatile disc (DVD), a floppy disk, a cartridge, a magnetic tape, and/or another type of non-transitory computer-readable medium, along with a corresponding drive.

Input component 450 includes a component that permits device 400 to receive information, such as via user input (e.g., a touch screen display, a keyboard, a keypad, a mouse, a button, a switch, and/or a microphone). Additionally, or alternatively, input component 450 may include a component for determining location (e.g., a global positioning system (GPS) component) and/or a sensor (e.g., an accelerometer, a gyroscope, an actuator, another type of positional or environmental sensor, and/or the like). Output component 460 includes a component that provides output information from device 400 (via, e.g., a display, a speaker, a haptic feedback component, an audio or visual indicator, and/or the like).

Communication interface 470 includes a transceiver-like component (e.g., a transceiver, a separate receiver, a separate transmitter, and/or the like) that enables device 400 to communicate with other devices, such as via a wired connection, a wireless connection, or a combination of wired and wireless connections. Communication interface 470 may permit device 400 to receive information from another device and/or provide information to another device. For example, communication interface 470 may include an Ethernet interface, an optical interface, a coaxial interface, an infrared interface, a radio frequency (RF) interface, a universal serial bus (USB) interface, a Wi-Fi interface, a cellular network interface, and/or the like.

Device 400 may perform one or more processes described herein. Device 400 may perform these processes based on processor 420 executing software instructions stored by a non-transitory computer-readable medium, such as memory 430 and/or storage component 440. As used herein, the term "computer-readable medium" refers to a non-transitory memory device. A memory device includes memory space within a single physical storage device or memory space spread across multiple physical storage devices.

Software instructions may be read into memory 430 and/or storage component 440 from another computer-readable medium or from another device via communication interface 470. When executed, software instructions stored in memory 430 and/or storage component 440 may cause processor 420 to perform one or more processes described herein. Additionally, or alternatively, hardware circuitry may be used in place of or in combination with software instructions to perform one or more processes described herein. Thus, embodiments described herein are not limited to any specific combination of hardware circuitry and software.

The number and arrangement of components shown in FIG. 4 are provided as an example. In practice, device 400 may include additional components, fewer components, different components, or differently arranged components than those shown in FIG. 4. Additionally, or alternatively, a set of components (e.g., one or more components) of device 400 may perform one or more functions described as being performed by another set of components of device 400.

FIG. 5 is a flow chart of an example process 500 associated with example embodiments described herein. In some embodiments, one or more process blocks of FIG. 5 may be performed by a scanner device (e.g., the scanner device of FIGS. 1A-1C, the scanner device 205 of FIG. 2, and/or the scanner device 310 of FIG. 3). Additionally, or alternatively, one or more process blocks of FIG. 5 may be performed by another device or a group of devices separate from or including the scanner device, such as the device management system and/or the certificate system of FIGS. 1A-1C, the WAP 210, the entity systems 225, the device management server 230, the WLAN controller 235, the ISE 240, the active directory 245, the CRL/OCSP 250, the certificate system 255, the enrollment portion 260, the primary service/protocol 265, the secondary service/protocol 270, the certificate authority 275, the issuing CA 280, and/or the security module of FIG. 2, the authorization platform 320 of FIG. 3, and/or the like.

As shown in FIG. 5, the process 500 may include providing, to a device management system, a request for authentication (block 510). For example, the scanner device (e.g., using processor 420, memory 430, storage component 440, input component 450, output component 460, communication interface 470, and/or the like) may provide, to a device management system, a request for authentication, as described herein.

As further shown in FIG. 5, the process 500 may include receiving, from the device management system, a file including a link to a certificate system (block 520). For example, the scanner device (e.g., using processor 420, memory 430, storage component 440, input component 450, output component 460, communication interface 470, and/or the like) may receive, from the device management system, a file including a link to a certificate system, as described herein.

As further shown in FIG. 5, the process 500 may include providing, using the link, a certificate enrollment request to the certificate system (block 530). For example, the scanner device (e.g., using processor 420, memory 430, storage component 440, input component 450, output component 460, communication interface 470, and/or the like) may provide, using the link, a certificate enrollment request to the certificate system, as described herein.

As further shown in FIG. 5, the process 500 may include receiving, from the certificate system, a signed certificate (block 540). For example, the scanner device (e.g., using processor 420, memory 430, storage component 440, input component 450, output component 460, communication interface 470, and/or the like) may receive, from the certificate system, a signed certificate, as described herein.

As further shown in FIG. 5, the process 500 may include establishing, using the signed certificate, a wireless connection to a network (block 550). For example, the scanner device (e.g., using processor 420, memory 430, storage component 440, input component 450, output component 460, communication interface 470, and/or the like) may establish, using the signed certificate, a wireless connection to a network, as described herein.

The process 500 may include additional embodiments, such as any single embodiment or any combination of embodiments described below and/or in connection with one or more other process described elsewhere herein.

In a first embodiment, the process 500 may include, before providing the request for authentication, establishing a wired communication link with the network, when providing the request for authentication, providing the request for authentication via the wired communication link, when receiving the file, receiving the file via the wired communication link, when providing the certificate enrollment request, providing the certificate enrollment request via the wired communication link, and when receiving the signed certificate, receiving the signed certificate via the wired communication link.

In a second embodiment, alone or in combination with the first embodiment, the process 500 may include generating a key, where the request for authentication includes the key, and where the certificate enrollment request includes the key.

In a third embodiment, alone or in combination with one or more of the first and second embodiments, the certificate system generates the signed certificate based on the key.

In a fourth embodiment, alone or in combination with one or more of the first through third embodiments, the file includes configuration instructions and the process 500 includes adjusting, based on the configuration instructions, a configuration of the system.

In a fifth embodiment, alone or in combination with one or more of the first through fourth embodiments, the process 500 includes after adjusting the configuration of the system and when establishing the wireless connection, establishing the wireless connection using ports and protocols identified by the configuration, In a sixth embodiment, alone or in combination with one or more of the first through fifth embodiments, the device management system is configured to authenticate the system for communication on the network for a time period and revoke authentication of the system after the time period.

In a seventh embodiment, alone or in combination with one or more of the first through sixth embodiments, a system implementing the process 500 includes a scanner device for processing instruments associated with resource allocations and a network device communicatively connected to the scanner device for enabling the scanner device to communicate wirelessly with the network.

In an eighth embodiment, alone or in combination with one or more of the first through seventh embodiments, process 500 includes scanning an instrument associated with a resource allocation and transmitting information regarding the instrument via the wireless connection to the network.

In a ninth embodiment, alone or in combination with one or more of the first through eighth embodiments, process 500 includes printing information on an instrument associated with a resource allocation and causing, based on printing the information and using the wireless connection, resources to be allocated.

In a tenth embodiment, alone or in combination with one or more of the first through ninth embodiments, process 500 includes providing, to the certificate system and via the wireless connection, a certificate renewal request and receiving, from the certificate system and via the wireless connection, confirmation of renewal of the signed certificate.

In an eleventh embodiment, alone or in combination with one or more of the first through tenth embodiments, process 500 includes, after receiving the signed certificate, storing the signed certificate in at least one non-transitory storage device.

In a twelfth embodiment, alone or in combination with one or more of the first through eleventh embodiments, the certificate system generates the signed certificate based on a unique identifier of the system, where the unique identifier is provided by a manufacturer of the system.

In a thirteenth embodiment, alone or in combination with one or more of the first through twelfth embodiments, the network is configured to restrict the system from accessing portions of the network until the system uses the signed certificate to establish the wireless connection to the network.

In a fourteenth embodiment, alone or in combination with one or more of the first through thirteenth embodiments, the certificate system includes a certificate enrollment server for receiving certificate enrollment requests, a certificate authority for receiving certificate signing requests from the certificate enrollment server and generating signed certificates, and a security module for encrypting signatures on certificates.

Although FIG. 5 shows example blocks of process 500, in some embodiments, process 500 may include additional blocks, fewer blocks, different blocks, or differently arranged blocks than those depicted in FIG. 5. Additionally, or alternatively, two or more of the blocks of process 500 may be performed in parallel.

The foregoing disclosure provides illustration and description, but is not intended to be exhaustive or to limit the embodiments to the precise form disclosed. Modifications and variations may be made in light of the above disclosure or may be acquired from practice of the embodiments.

It will be apparent that systems and/or methods described herein may be implemented in different forms of hardware, firmware, or a combination of hardware and software. The actual specialized control hardware or software code used to implement these systems and/or methods is not limiting of the embodiments. Thus, the operation and behavior of the systems and/or methods are described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of various embodiments. In fact, many of these features may be combined in ways not specifically recited in the claims and/or disclosed in the specification. Although each dependent claim listed below may directly depend on only one claim, the disclosure of various embodiments includes each dependent claim in combination with every other claim in the claim set.

As used herein, the term "component" is intended to be broadly construed as hardware, firmware, or a combination of hardware and software.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

As will be appreciated by one of ordinary skill in the art in view of this disclosure, the present invention may include and/or be embodied as an apparatus (including, for example, a system, machine, device, computer program product, and/or the like), as a method (including, for example, a business method, computer-implemented process, and/or the like), or as any combination of the foregoing. Accordingly, embodiments of the present invention may take the form of an entirely business method embodiment, an entirely software embodiment (including firmware, resident software, micro-code, stored procedures in a database, or the like), an entirely hardware embodiment, or an embodiment combining business method, software, and hardware aspects that may generally be referred to herein as a "system." Furthermore, embodiments of the present invention may take the form of a computer program product that includes a computer-readable storage medium having one or more computer-executable program code portions stored therein. As used herein, a processor, which may include one or more processors, may be "configured to" perform a certain function in a variety of ways, including, for example, by having one or more general-purpose circuits perform the function by executing one or more computer-executable program code portions embodied in a computer-readable medium, and/or by having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, electromagnetic, infrared, and/or semiconductor system, device, and/or other apparatus. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as, for example, a propagation signal including computer-executable program code portions embodied therein.

One or more computer-executable program code portions for carrying out operations of the present invention may include object-oriented, scripted, and/or unscripted programming languages, such as, for example, Java, Perl, Smalltalk, C++, SAS, SQL, Python, Objective C, JavaScript, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F #.

Some embodiments of the present invention are described herein with reference to flowchart illustrations and/or block diagrams of apparatus and/or methods. It will be understood that each block included in the flowchart illustrations and/or block diagrams, and/or combinations of blocks included in the flowchart illustrations and/or block diagrams, may be implemented by one or more computer-executable program code portions. These one or more computer-executable program code portions may be provided to a processor of a general purpose computer, special purpose computer, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

The one or more computer-executable program code portions may be stored in a transitory and/or non-transitory computer-readable medium (e.g. a memory) that can direct, instruct, and/or cause a computer and/or other programmable data processing apparatus to function in a particular manner, such that the computer-executable program code portions stored in the computer-readable medium produce an article of manufacture including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with, and/or replaced with, operator- and/or human-implemented steps in order to carry out an embodiment of the present invention.

Although many embodiments of the present invention have just been described above, the present invention may be embodied in many different forms and should not be construed as limited to the embodiments set forth herein; rather, these embodiments are provided so that this disclosure will satisfy applicable legal requirements. Also, it will be understood that, where possible, any of the advantages, features, functions, devices, and/or operational aspects of any of the embodiments of the present invention described and/or contemplated herein may be included in any of the other embodiments of the present invention described and/or contemplated herein, and/or vice versa. In addition, where possible, any terms expressed in the singular form herein are meant to also include the plural form and/or vice versa, unless explicitly stated otherwise. Accordingly, the terms "a" and/or "an" shall mean "one or more," even though the phrase "one or more" is also used herein. Like numbers refer to like elements throughout.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the just described embodiments can be configured without departing from the scope and spirit of the invention. Therefore, it is to be understood that, within the scope of the appended claims, the invention may be practiced other than as specifically described herein.

What is claimed is:

1. A scanner device for secure resource allocation communication with a network, wherein the scanner device is communicatively connected to a network device for enabling the scanner device to communicate wirelessly with the network, the scanner device comprising:
   one or more sensors for processing checks associated with payment transactions;
   at least one non-transitory storage device;
   at least one processing device coupled to the at least one non-transitory storage device, wherein the at least one non-transitory storage device comprises one or more executable program code portions configured to cause the at least one processing device to:
      establish a wired communication link with the network, wherein the network is managed by an entity, wherein the scanner device is associated with the entity, and wherein the entity is a financial institution;
      provide, via the wired communication link and to a device management system associated with the entity, a request for authentication;
      receive, via the wired communication link, in response to providing the request, and from the device management system, a file comprising configuration instructions and a link to a certificate system associated with the entity;
      provide, via the wired communication link and using the link, a certificate enrollment request to the certificate system;
      receive, via the wired communication link, in response to providing the certificate enrollment request, and from the certificate system, a signed certificate;
      adjust a configuration of the scanner device and the network device to use ports and protocols identified by the configuration instructions from the device management system;
      establish, using the signed certificate, the network device, and the ports and the protocols identified by the configuration instructions, a wireless connection to the network;
      scan, using the one or more sensors, a check associated with a payment transaction; and
      transmit, using the network device and the wireless connection, information regarding the check through the network to a system for processing payment transactions, wherein the system is managed by the financial institution.

2. The scanner device of claim 1, wherein the at least one non-transitory storage device comprises one or more executable program code portions configured to cause the at least one processing device to generate a key, wherein the request for authentication comprises the key, and wherein the certificate enrollment request comprises the key.

3. The scanner device of claim 2, wherein the certificate system generates the signed certificate based on the key.

4. The scanner device of claim 1, wherein the device management system is configured to:
authenticate the system for communication on the network for a time period; and
revoke authentication of the system after the time period.

5. The scanner device of claim 1, wherein the at least one non-transitory storage device comprises one or more executable program code portions configured to cause the at least one processing device to:
print information on the check associated with the payment transaction; and
cause, based on printing the information and using the wireless connection, resources to be allocated.

6. The scanner device of claim 1, wherein the at least one non-transitory storage device comprises one or more executable program code portions configured to cause the at least one processing device to:
provide, to the certificate system and via the wireless connection, a certificate renewal request; and
receive, from the certificate system and via the wireless connection, confirmation of renewal of the signed certificate.

7. The scanner device of claim 1, wherein the at least one non-transitory storage device comprises one or more executable program code portions configured to cause the at least one processing device to, after receiving the signed certificate, store the signed certificate in the at least one non-transitory storage device.

8. The scanner device of claim 1, wherein the certificate system generates the signed certificate based on a unique identifier of the scanner device, wherein the unique identifier is provided by a manufacturer of the scanner device.

9. The scanner device of claim 1, wherein the network to restrict the scanner device from accessing portions of the network until the scanner device uses the signed certificate to establish the wireless connection to the network.

10. The scanner device of claim 1, wherein the certificate system comprises:
a certificate enrollment server for receiving certificate enrollment requests;
a certificate authority for receiving certificate signing requests from the certificate enrollment server and generating signed certificates; and
a security module for encrypting signatures on certificates.

11. A computer program product for secure resource allocation communication with a network, the computer program product comprising a non-transitory computer-readable medium comprising code causing a scanner device to:
establish a wired communication link with the network, wherein the network is managed by an entity, wherein the scanner device is associated with the entity, and wherein the entity is a financial institution;
provide, via the wired communication link and to a device management system associated with the entity, a request for authentication;
receive, via the wired communication link, in response to providing the request, and from the device management system, a file comprising configuration instructions and a link to a certificate system associated with the entity;
provide, via the wired communication link and using the link, a certificate enrollment request to the certificate system;
receive, via the wired communication link, in response to providing the certificate enrollment request, and from the certificate system, a signed certificate;
adjust a configuration of the scanner device and a network device communicatively to the scanner device to use ports and protocols identified by the configuration instructions from the device management system;
establish, using the signed certificate, the network device, and the ports and the protocols identified by the configuration instructions, a wireless connection to a network, wherein the scanner device is communicatively connected to the network device for enabling the scanner device to communicate wirelessly with the network;
scan, using one or more sensors of the scanner device, a check associated with a payment transaction, wherein the one or more sensors are configured for processing checks associated with payment transactions; and
transmit, using the network device and the wireless connection, information regarding the check through the network to a system for processing payment transactions, wherein the system is managed by the financial institution.

12. The computer program product of claim 11, wherein the non-transitory computer-readable medium comprises code causing the scanner device to generate a key, wherein the request for authentication comprises the key, and wherein the certificate enrollment request comprises the key.

13. The computer program product of claim 12, wherein the certificate system generates the signed certificate based on the key.

14. A method for secure resource allocation communication with a network, the method comprising:
establishing, with a scanner device, a wired communication link with the network, wherein the network is managed by an entity, wherein the scanner device is associated with the entity, and wherein the entity is a financial institution;
providing, with the scanner device via the wired communication link and to a device management system associated with the entity, a request for authentication, wherein the scanner device comprises one or more sensors for processing checks associated with payment transactions, and wherein the scanner device is communicatively connected to a network device for enabling the scanner device to communicate wirelessly with the network;
receiving, with the scanner device via the wired communication link, in response to providing the request, and from the device management system, a file comprising configuration instructions and a link to a certificate system associated with the entity;
providing, with the scanner device via the wired communication link and using the link, a certificate enrollment request to the certificate system;
receiving, with the scanner device via the wired communication link, in response to providing the certificate enrollment request, and from the certificate system, a signed certificate;
adjusting a configuration of the scanner device and the network device to use ports and protocols identified by the configuration instructions from the device management system;
establishing, with the scanner device, using the network device, using the signed certificate, and using the ports and the protocols identified by the configuration instructions, a wireless connection to the network;

scanning, with the scanner device and using the one or more sensors, a check associated with a payment transaction; and transmitting, with the scanner device, using the network device, and using the wireless connection, information regarding the check through the network to a system for processing payment transactions, wherein the system is managed by the financial institution.

15. The method of claim 14, comprising generating a key, wherein the request for authentication comprises the key, and wherein the certificate enrollment request comprises the key.

16. The method of claim 15, wherein the certificate system generates the signed certificate based on the key.

17. The method of claim 14, wherein the device management system to:

authenticate the system for communication on the network for a time period; and revoke authentication of the system after the time period.

18. The method of claim 14, comprising:

printing information on the check associated with the payment transaction; and causing, based on printing the information and using the wireless connection, resources to be allocated.

19. The method of claim 14, comprising, after receiving the signed certificate, storing the signed certificate.

20. The method of claim 14, wherein the certificate system generates the signed certificate based on a unique identifier of the scanner device, wherein the unique identifier is provided by a manufacturer of the scanner device.

\* \* \* \* \*